US007123461B2

(12) United States Patent
Wimmer

(10) Patent No.: US 7,123,461 B2
(45) Date of Patent: Oct. 17, 2006

(54) METHOD AND DEVICE FOR MONITORING SWITCHGEAR IN ELECTRICAL SWITCHGEAR ASSEMBLIES

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 10/837,576

(22) Filed: May 4, 2004

(65) Prior Publication Data

US 2004/0223276 A1 Nov. 11, 2004

(30) Foreign Application Priority Data

May 7, 2003 (EP) .................................. 03405322

(51) Int. Cl.
*H02H 3/08* (2006.01)
*H02H 9/02* (2006.01)

(52) U.S. Cl. .................... 361/93.1; 361/93.6; 324/424; 324/207.15

(58) Field of Classification Search ............... 361/93.6, 361/87, 93.1; 324/424, 207.15
See application file for complete search history.

(56) References Cited

U.S. PATENT DOCUMENTS 4,620,156 A * 10/1986 Alvin et al. ................ 324/424
4,780,786 A * 10/1988 Weynachter et al. .......... 361/87
6,466,023 B1 * 10/2002 Dougherty et al. ......... 324/424

FOREIGN PATENT DOCUMENTS

DE 199 28 192 A1 12/2000
DE 102 04 849 A1 8/2002
EP 0 193 732 A1 9/1986

* cited by examiner

*Primary Examiner*—Stephen W. Jackson
*Assistant Examiner*—Zeev Kitov
(74) *Attorney, Agent, or Firm*—Buchanan Ingersoll & Rooney PC

(57) ABSTRACT

The invention relates to a method, a computer programme and a device (2) for determining contact wear in an electrical switchgear (3) in an electric switchgear assembly (1) as well as to a switchgear assembly (1) with such a device (2). According to invention, for determining a contact wear status variable (Cwsum) a current measuring signal ($I_{mess}$) is monitored for deviations (Δ) from an expected faulty switch-off current ($I_f$) and, in case of deviations, the status variable (Cwsum) is not immediately calculated from current measuring signal ($I_{mess}$), but indirectly using a characteristic current value ($I_{char}$). Embodiments, among other things, relate to: deviations by saturation of the current transformer (30) and maximal current measuring signal ($I_{max}$) as characteristic current value ($I_{char}$); status variable (Cwsum) as a measure for arcing power during switching-off and, in particular, equal to a potential function ($f(I_{mess})$) of the switch-off current ($I_{mess}$). Advantages, among others, are: improved calculation of contact wear, improved condition based instead of periodic maintenance of switchgears (3), increased operational safety at reduced maintenance cost.

14 Claims, 2 Drawing Sheets

METHOD AND DEVICE FOR MONITORING SWITCHGEAR IN ELECTRICAL SWITCHGEAR ASSEMBLIES

TECHNICAL FIELD

The invention relates to the field of secondary technology for electrical switchgear assemblies, especially to the monitoring of switchgear in high-, medium- or low-voltage switchgear assemblies. The invention starts from a method, a computer program, and a device for determining contact wear of circuit breakers in an electrical switchgear assembly and from a switchgear assembly having such a device according to the preamble of the independent claims.

PRIOR ART

Nowadays, in most electricity supply companies, maintenance of the circuit breakers is carried out periodically, occasionally with preferred maintenance, if protective shutdowns have occurred possibly with high currents. Thus, maintenance of the switchgear is generally carried out much too frequently with the additional risk that damage will be caused during the maintenance.

DE 102 04 849 A1 discloses a method for determining contact wear in a trigger unit. A cumulative energy converted in the circuit breaker contacts, which is proportional to the contact wear, is calculated. For this purpose the contact current I is scanned during the contact separation time, squared, multiplied by a fixed time T between scannings and summed for each contact pair relative to each type of fault or as a total value. The time delay between triggering the circuit breaker and the contact movement in the circuit breaker can be measured or estimated on the basis of typical mechanism times or those published by the manufacturer. If adjustable threshold values for the contact wear are exceeded, a warning signal or alarm signal can be given or a shutdown or maintenance of the circuit breaker can be triggered. As an alternative to the $I^2T$ measurement, the arcing energy can also be determined from voltage times current or approximately from current I times time T. A disadvantage is that current measurement errors in cases of overcurrents remain disregarded for determining arcing energy and contact wear. The relatively high measurement and computing expenditure is also a disadvantage.

EP 0 193 732 A1 discloses a monitoring and control device for switchgear and switchgear combinations for determining the required maintenance times. For this purpose wear states of the switchgear are measured or calculated by a plurality of sensors and graded alarm or maintenance information is generated according to urgency. The contact wear can be recorded directly, for example, by position indicators, angle measuring sensors, or light barriers or determined indirectly by linking current magnitude, switching voltage, phase angle, number of circuits, switching instants, current gradient or time constants. In particular, the contact wear is determined indirectly by evaluating the current and temperature of the respective current path. Disadvantages are the high measurement requirement and expensive signal processing. Measurement errors as a result of saturation of the current transformer are also not taken into account.

DESCRIPTION OF THE INVENTION

The object of the present invention is to provide a method, a computer program, a device and a switchgear assembly having such a device for improved and simplified monitoring of switchgear in electrical switchgear assemblies. This object is solved by the features of the independent claims.

In a first aspect the invention consists in a method for determining contact wear in an electrical switchgear, especially in electric switchgear assemblies for high and medium voltage, wherein a contact current flowing through the switchgear during a switching action is recorded using a current transformer and is evaluated with regard to contact wear, wherein in order to determine a status variable characterising the contact wear, a current measuring signal of the current transformer is first measured as a function of the time, in the event of deviations between the predicted contact current and the current measuring signal, the presence of a measurement error is detected and in the event of detection of the measurement error, at least one characteristic current value is determined from the current measuring signal and is used to determine the status variable. The status variable should be selected such that it is a reliable measure for the contact wear. The predicted contact current is especially characterised by the time behaviour of the contact current, especially by reaching a moderate current maximum at the end of a quarter or three-quarter period of the mains frequency of the mains current applied to the switchgear. Other predicted contact currents are also feasible depending on the switching action and type of fault. Contact wear can also be determined with high reliability by the method if the error or arcing current relevant for the contact wear is not or cannot be correctly measured. In this case, the use of the characteristic current value instead of the complete current measuring signal represents a simplification and increase in precision of the calculations of the contact wear. On the whole, the contact wear can be calculated more accurately and the maintenance of circuit breakers and similar switchgear can be implemented as required instead of periodically without loss of operating safety, whereby the maintenance costs are correspondingly reduced.

In a first exemplary embodiment, saturation of the current measuring signal is detected as the measurement error and a maximum current measuring signal of the current transformer is used as the characteristic current value, if it occurs before reaching a quarter period of an alternating current applied to the switchgear and especially is detected. The saturation of conventional current transformers frequently makes it impossible to measure the arcing overcurrent exactly and thereby falsifies the calculations of the contact wear specifically for those cases of faults which bring about the most contact wear. This can only be corrected by calculations.

The exemplary embodiment according to claim 3 has the advantage that high fault currents can be recorded and the status variable is a reliable measure for the contact wear which can easily be calculated.

The exemplary embodiment according to claim 4 has the advantage that a very simple calculation specification can be given for calculations of contact wear.

The exemplary embodiment according to claim 5 has the advantage that the reliability of the contact wear calculations is improved by exactly determining the start of arcing.

The exemplary embodiment according to claim 6 has the advantage that a choice of functions is given to calculate the contact wear and if necessary, a special function can be selected for specific switchgear or fault current events.

The exemplary embodiment according to claim 7 has the advantage that manufacturer's information can also be used for improved calculations of contact wear.

The exemplary embodiment according to claim 8 has the advantage that an additional independent calculation of contact wear can be made.

The exemplary embodiment according to claim 9 has the advantage that the contact wear can be permanently monitored and/or can be determined subsequently from archived data. In particular, fault recorder data can be used such as are present, for example, in a fault recorder collecting system, also known as station monitoring system or SMS.

In further aspects the invention relates to a computer program for determining contact wear in an electrical switchgear, wherein the process steps according to claims 1–9 are implemented by program codes, and furthermore relates to a device for implementing the method and a switchgear assembly comprising the device.

Other embodiments, advantages and applications of the invention are obtained from dependent claims as well as from the following description and the figures.

BRIEF DESCRIPTION OF THE DRAWINGS

In the figures the same parts are provided with the same reference numbers.

WAYS OF IMPLEMENTING THE INVENTION

Figure 1:
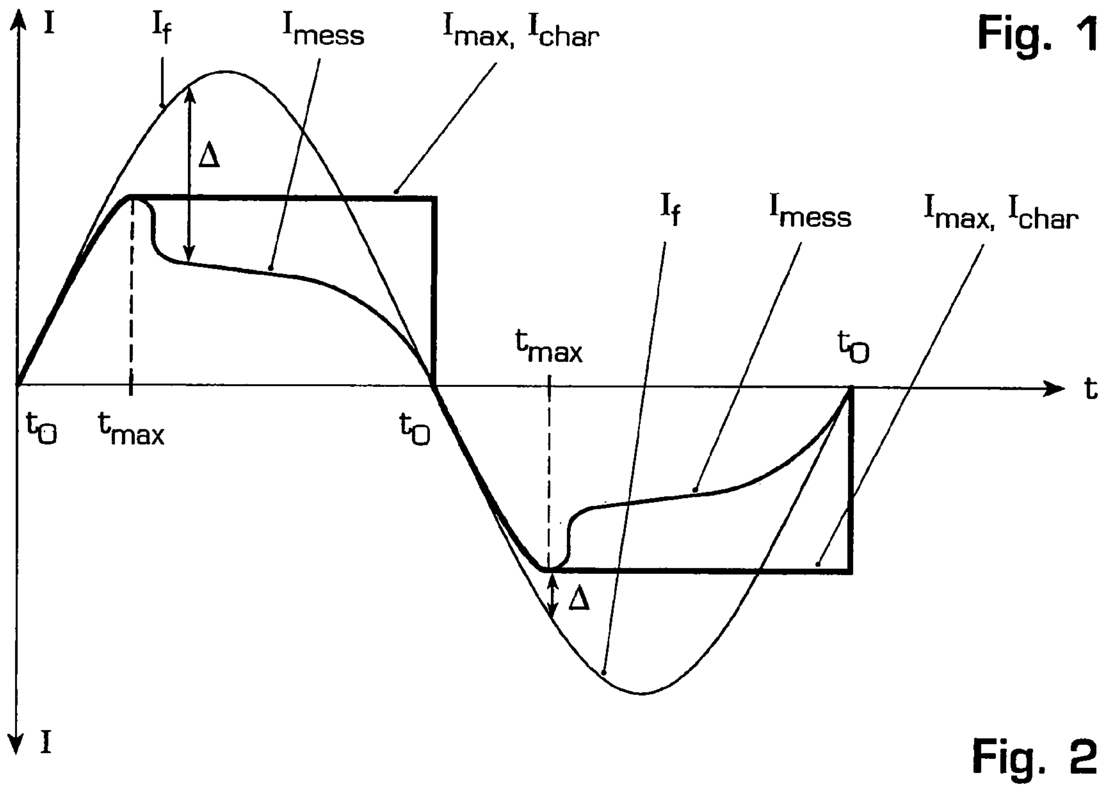
FIG. 1 is a schematic diagram for approximation of the current in calculations of contact wear according to the invention for circuit breakers.

Circuit breakers are designed for a certain number of mechanical switching actions or switching cycles. If fairly high currents are switched off by them, in cases of faults for example, the contacts are worn more severely by the ensuing arcs than in normal switching actions. In order that the circuit breakers remain in working order, the contacts must be replaced before they are completely worn. The degree of wear per switching action depends on the energy of the arc which appears. This energy is proportional to the integral $\int I^2 dt$, where I is the current flowing during the arc duration and t is the time.

According to the invention, switches 3 in electric switchgear assemblies 1 are monitored for contact wear, wherein a contact current $I_f$ flowing through the switch 3 during a switching action is recorded at least approximately by a current measuring signal $I_{mess}$ of a current transformer 30 or current sensor 30 as a function of the time t, in the event of deviations between predicted contact current $I_f$ and current measuring signal $I_{mess}$, a measurement error $\Delta$ is detected and at least one characteristic current value $I_{char}$ is determined from the current measuring signal $I_{mess}$ and is used to determine a status variable characterising any contact wear. This estimate is frequently somewhat too conservative but always on the safe side. The method can be a component of a power system monitoring system.

For this purpose FIG. 1 shows an exemplary embodiment in which a largely sinusoidal fault current $I_f$ occurs. Saturation occurs in the current measuring signal $I_{mess}$ and it will pass through a current maximum I at the time $t_{max}$ within a quarter period of the fault current signal $I_f$ or the mains frequency applied to the switchgear 3. The appearance of the current maximum $I_{max}$ is detected if the deviation or the measurement error $\Delta$ between the fault current profile $I_f(t)$ and the current measuring signal profile $I_{mess}(t)$ exceeds a tolerance value $\Delta_{min}$. The contact current $I_f$ is typically an overcurrent or short-circuit current $I_f$ during a switch-off action whose time profile is known highly accurately beforehand. In particular, a current maximum $I_{max}$ which occurs in the current measuring signal $I_{mess}$ before reaching a quarter period of the mains frequency is a reliable indication for a measurement error $\Delta$. The current maximum $I_{max}$ is now defined as a characteristic current value $I_{char}$ and used to calculate the contact wear status variable. The status variable should preferably be a measure for an arcing power during the switching action and in particular a contact current time integral.

In the example according to FIG. 1, the current measuring signal $I_{mess}$ is recorded from a first time point $t_0$ at the beginning of the current half-wave in which the switching action occurs until a second time point $t_{max}$, at which a maximum current measuring signal $I_{max}$ occurs and from the second time point $t_{max}$ until a third time point $t_0$ at the end of the current half-wave, is approximated by the maximum current measuring signal $I_{max}$. The accuracy of the contact wear calculations depends on how accurately the starting time of the arc can be determined. The first time $t_0$ should be defined as the starting time of the arc of the contact current $I_f$. The calculation is most accurate if $t_0$ is known as a binary indication in fault notation; $t_0$ can also be determined with a time delay based on empirical values, from an opening command, a protection trigger command or a contact movement of the switch 3. Any fluctuations of this time value are of secondary importance compared with other influential factors and irregularities during contact wear. Systematic errors caused by too high or too low values of the starting time to can be corrected, if for example on the occasion of maintenance, the predicted wear is compared with the actual wear and the time delay is corrected accordingly. For safety reasons, a too low value of the time delay should be used at the beginning of a contact wear history rather than a too high value, so that the contact wear is initially overestimated in the calculations.

In order to determine the status variable, a time integral $\int f(I_{mess})dt$ is then formed in terms of a function $f(I_{mess})$ of the current measuring signal $I_{mess}$ which has been recorded in sections and approximated in sections. Preferably a power function $f(I_{mess})=I_{mess}^{a}$ where a=1.2 . . . 2.2, especially a=1.6 . . . 2.0, is used as the function $f(I_{mess})$ of the current measuring signal $I_{mess}$. For example, the integral $\int I_{mess}^2 dt$, or $\int I_{mess}^{1.6} dt$ is determined using the current measuring signal $I_{mess}$ approximated according to FIG. 1 for approximate determination of the contact wear. A square root function $f(I_{mess})=(I_{mess}^2)^{1/2}$ defining an effective switch-off current $I_{eff}$ can also be used as the function $f(I_{mess})$. Other functions $f(I_{mess})$ are also possible. The time integral $\int f(I_{mess})dt$ in terms of the function $f(I_{mess})$ can also be approximated by summation of function values at data points, wherein the data points are given, for example, by scanning the current measuring signal $I_{mess}$. In particular, the status variable is selected to be equal to the time integral $\int I(I_{mess})dt$ times a contact wear constant c and the contact wear constant c is selected from manufacturer's data, especially from curves giving the number of permitted switching actions $N(I_{eff})$ as a function of an effective switch-off current per switching action $I_{eff}$, and/or from empirical values for a type of switch and switch usage location.

Figure 2:
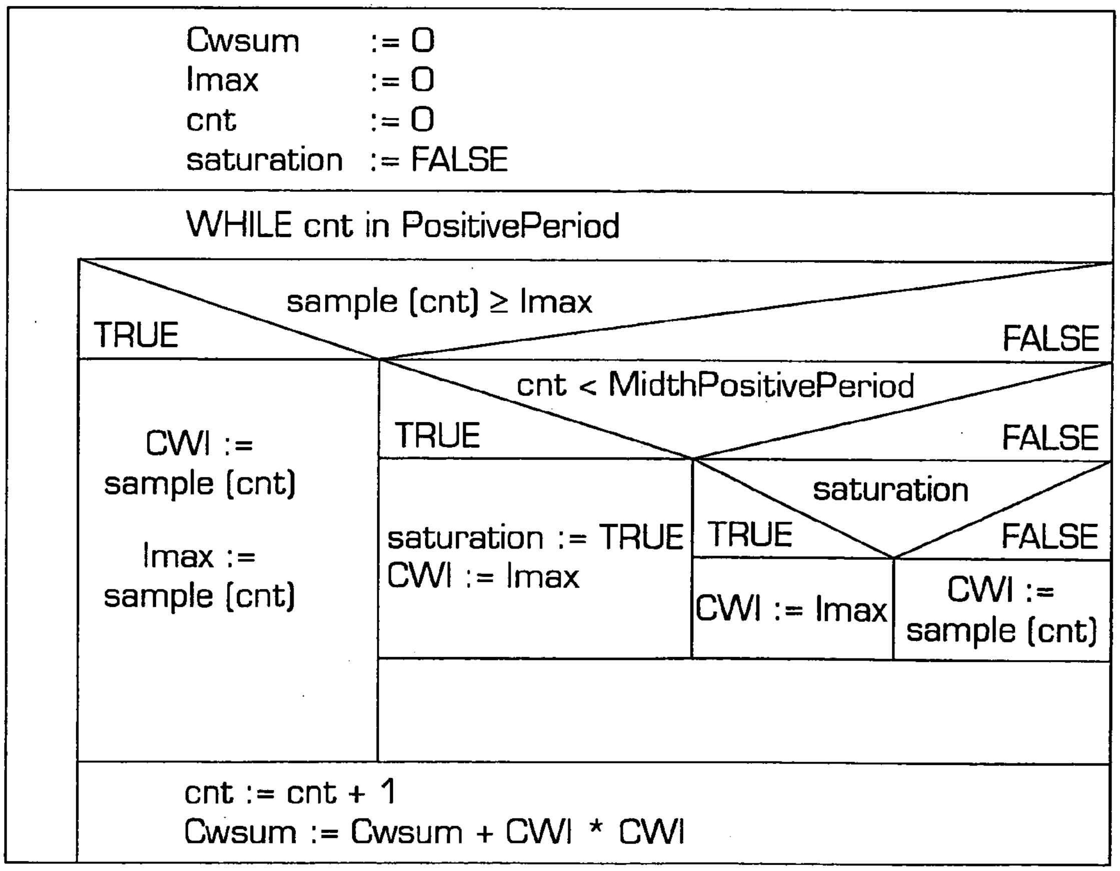
FIG. 2 is an algorithm for calculations of contact wear according to the invention using a Nassi-Schneiderman diagram.

FIG. 2 shows a software algorithm in Nassi-Schneidermann representation for implementing the method in a computer program and computer program product. First the quantities Cwsum (=status variable for characterising the contact wear), $I_{max}$, cnt (=counter variable) and saturation (constant) are initialised. Then, in a While loop which is dependent on cnt being in a positive (or alternatively negative, not shown here) half period of the mains alternating voltage, a scanning value sample(cnt) of the current measuring signal is read in for each cnt value and checked for the condition sample(cnt)$\geqq I_{max}$. If the condition is satisfied, an auxiliary variable CWI and $I_{max}$ are set equal to sample(cnt). If the condition is not satisfied, if cnt is smaller than the centre of the positive (or negative, not shown here) half-period MidthPositivePeriod, saturation true and CWI is set equal to $I_{max}$; if cnt$\geqq$MidthPositivePeriod, for saturation=true CWI is set equal to $I_{max}$ and for saturation=false CWI is set equal to sample(cnt). Finally the counter cnt is incremented by 1 and for the contact wear status variable Cwsum the square of the auxiliary variable CWI is added. At the end of the half-period, the summation or integration of Cwsum is completed. In this case, in accordance with FIG. 1, Cwsum is precisely the time integral over the square of the approximated current which in the time interval $t_0$ to $t_{max}$ is given by the current measuring signal $I_{mess}$ according to the scanning values sample (cnt) and in the time interval $t_{max}$ to the next to is approximated by the current maximum $I_{max}$.

Figure 3:
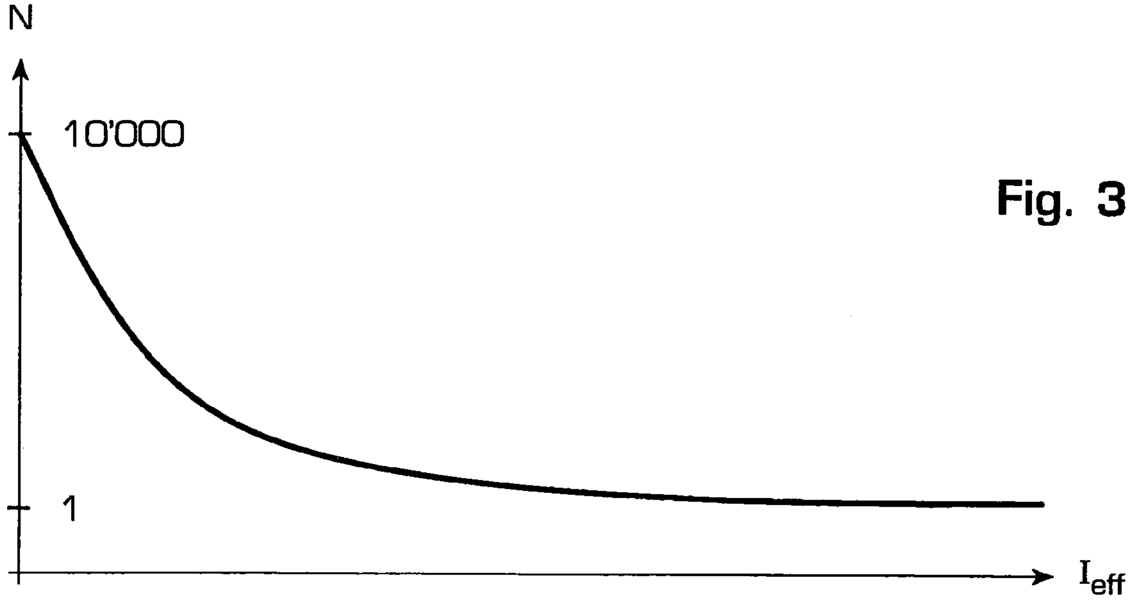
FIG. 3 is a curve showing the number of permitted switching actions as a function of the effective switch-off current per switching action.

FIG. 3 shows an example of a curve from a circuit breaker manufacturer which curve correlates the maximum number of permitted switching actions N with an effective switch-off current per switching action $I_{eff}$ and thus with a certain cumulative effective switch-off current. Should the contact wear be determined using the integral $\int I^2dt$, allowance must also be made for a proportionality constant c specific to the switchgear or specific to the type of switchgear between the integral and the contact wear which is given by the switchgear manufacturer and/or can be determined by comparison of measurements with calculations of the contact wear.

According to a preferred embodiment of the invention, an effective switch-off current $I_{eff}$ can be determined for each switching action, using a curve giving the number of permitted switching actions $N(I_{eff})$ as a function of the switch-off current $I_{eff}$, contact wear can be determined as a percentage of the switching actions carried out relative to the total number permitted at this effective switch-off current $I_{eff}$ and the percentages for all the relevant switching actions carried out can be summed to give a cumulative contact wear. The cumulative percentage is a control variable for the contact wear status variable Cwsum determined according to the invention. For example, maintenance of the switchgear 3 can be instigated at the first time at which the status variable Cwsum exceeds a limiting value or the cumulative percentage reaches 100% minus a residual safety margin for the next one to two switching actions with the maximum permissible $I_{eff}$ for this switch 3.

Figure 4:
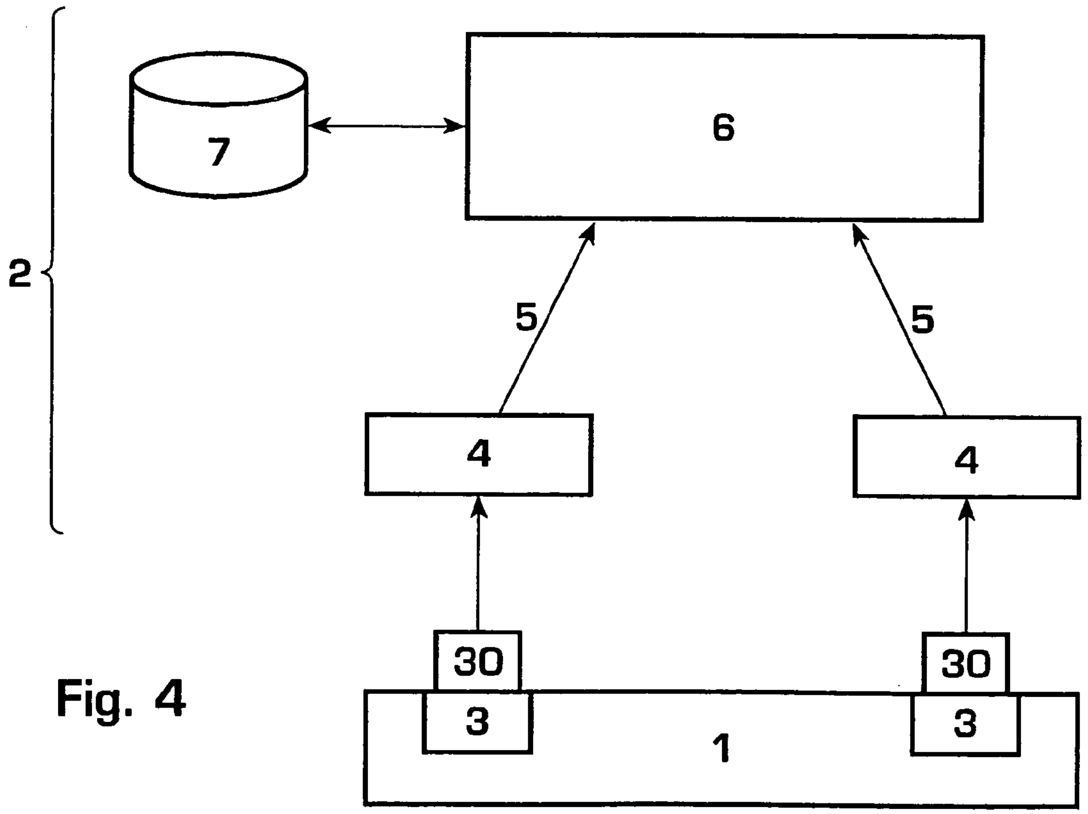
FIG. 4 is a schematic diagram of a data acquisition system according to the invention for contact wear in an electrical switchgear assembly.

FIG. 4 shows a schematic diagram of a data acquisition system for determining the contact wear status variable according to the invention Cwsum and/or the cumulative percentage from $N(I_{eff})$. The switchgear assembly 1 has switchgear 3, typically a circuit breaker 3 which is fitted with current transformers 30 or current sensors 30, typically conventional current transformers 30 with a saturable core. For example, measuring transducers are saturated with 1% accuracy and charge current transformers with 0.1%–0.5% accuracy at the high currents which bring about the most contact wear. As a result, conventional contact wear estimates using the integral $\int I_{mess}^2dt$ are very inaccurate and in any case too small and thus unsuited or risky for determining maintenance times as required. On the other hand, classical protection transformers for overcurrent functions have a large measurement range without saturation but are relatively inaccurate for small currents so that they typically belong to an accuracy class of 2%–5%. Improved contact wear calculations can also be achieved for these transducers by the invention by selecting a characteristic current value $I_{char}$ with which the measurement error Δ in the current measuring signal $I_{mess}$ can be corrected such the most accurate possible determination of the status variable Cwsum and especially of an arcing power relevant to contact wear is achieved. The current transformers 30 are connected to means 4 for data acquisition at electrical switchgear 3, especially to fault recorders 4, protection devices 4 or controllers 4. These data acquisition means 4 are connected to a central recording unit 6 for calculations of contact wear via a serial communication 5 or a data carrier 5 and preferably to a database 7 for data on contact wear.

The method described above can be implemented using this device 2 for calculating contact wear. In particular, the contact wear can be monitored on-line, i.e., continuously during operation or it can be evaluated with reference to archived data, especially using a function $f(I_{mess})$ of the current measuring signal $I_{mess}$, matched to a type of switchgear or a switchgear usage location. In this case, the contact wear can be determined from recordings of switch-off currents $I_{mess}$ from fault recorders 4 or protection and control devices 4 having a fault recording function, wherein all recordings of the switch-off currents $I_{mess}$ of a switchgear assembly 1 are collected centrally, especially in an existing fault recorder collecting system 4–6 or one specially designed for this purpose, also known as SMS or Station Monitoring System. The invention also extends to such a device 2 for calculations of contact wear which, for example, is integrated in the plant management system (not shown here) of the switchgear assembly 1 which comprises such a device 2. On the whole, improved condition-controlled maintenance of switchgear 3 and their switchgear contacts rather than periodic maintenance is achieved.

Reference List

1 Electrical switchgear assembly
2 Data acquisition system for contact wear
3 Electric switchgear, circuit breaker
30 Current transformer, current sensor
4 Means for data acquisition at electrical switchgear; fault recorder, protection device, control device
5 Serial communication, data carrier
6 Central data acquisition; means for calculating contact wear
7 Database for data on contact wear
I Contact current, arcing current
$I_{char}$ Characteristic current value
$I_{eff}$ Effective current
$I_f$ Fault current
$I_{max}$ Maximum current
$I_{mess}$ Current measuring signal
t, $t_0$, $t_{max}$ Time
cnt, CWI, Cwsum, Sample Variables PositivePeriod, MidthPositivePeriod, saturation constants
N Number of permitted switching actions

The invention claimed is:

1. A method for determining contact wear in an electrical switchgear of an electric switchgear assembly, wherein a contact current ($I_f$) flowing through the switchgear during a switching action is recorded using a current transformer and is evaluated with regard to contact wear, wherein a) in order to determine a status variable characterizing the contact wear (Cwsum), a current measuring signal ($I_{mess}$) of the current transformer is first measured as a function of the time, b) in the event of deviations between the predicted contact current ($I_f$) and the current measuring signal ($I_{mess}$), a saturation of the current measuring signal ($I_{mess}$) as a measurement error ($\Delta$) is detected, c) in the event of detection of the measurement error ($\Delta$) at least one characteristic current value ($I_{char}$) is determined from the current measuring signal ($I_{mess}$) and is used to determine the status variable (Cwsum), and d) the at least one characteristic current value ($I_{char}$) is a maximum current measuring signal ($I_{max}$).

2. The method according to claim 1, wherein a maximum current measuring signal ($I_{max}$) of the current transformer, which occurs before reaching a quarter period of an alternating current applied to the switchgear, is used as the characteristic current value ($I_{char}$).

3. The method according to claim 1, wherein a) the contact current ($I_f$) is an overcurrent or a short-circuit current ($I_f$) during a switch-off action and/or b) the status variable (Cwsum) is a measure for an arcing power during the switching action based on a contact current time integral.

4. The method according to claim 1, wherein a) the current measuring signal ($I_{mess}$) is recorded from a first time point ($t_0$) at the beginning of the current half-wave in which the switching action occurs, until a second time point ($t_{max}$), at which the maximum current measuring signal ($I_{max}$) occurs, and from the second time point ($t_{max}$) until a third time point ($t_0$) at the end of the current half-wave, is approximated by the maximum current measuring signal ($I_{max}$) and b) in order to determine the status variable (Cwsum) a time integral $\int f(I_{mess})dt$ is formed over a function $f(I_{mess})$ of the recorded and approximated current measuring signal ($I_{mess}$).

5. The method according to claim 4, wherein a) the first time point ($t_0$) is defined as the starting time of an arc of the contact current ($I_f$) and is determined with a time delay based on empirical values from an opening command, a protection trigger command or a contact movement of the switchgear and b) the time delay is corrected by comparing actual values with predicted values of the contact wear.

6. The method according to claim 4, wherein a power function $f(I_{mess})=I_{mess}^{a}$ where a=1.2 . . . 2.2, especially a=1.6 . . . 2.0, or a square root function $f(I_{mess})=(I_{mess}^{2})^{1/2}$ defining an effective switch-off current ($I_{eff}$) is used as the function $f(I_{mess})$ of the current measuring signal ($I_{mess}$).

7. The method according to claim 4, wherein a) the status variable (Cwsum) is selected to be equal to the time integral $\int f(I_{mess})dt$ times a contact wear constant c and b) the contact wear constant c is determined from manufacturer's data based on at least one of curves giving the number of permitted switching actions as a function of an effective switch-off current per switching action ($i_{eff}$), and empirical values for a type of switchgear and switchgear usage location.

8. The method according to claim 1, wherein a) an effective switch-off current ($I_{eff}$) is determined for each switching action, b) from a curve ($N(I_{eff})$) giving the number of permitted switching actions (N) as a function of the effective switch-off current ($I_{eff}$), a contact wear is determined as a percentage of the switching actions executed relative to the total number permitted for this effective switch-off current ($I_{eff}$) and c) the percentages for all the relevant switching actions executed are summed to give a cumulative contact wear.

9. The method according to claim 1, wherein a) the contact wear is monitored on-line or is evaluated with reference to archived data, especially using a matched function $f(I_{mess})$ of the current measuring signal ($I_{mess}$), and/or b) the contact wear is determined from recordings of switch-off currents ($I_{mess}$) from fault recorders or protection and control equipment having a fault recording function, wherein all recordings of the switch-off currents ($I_{mess}$) of a switchgear assembly are collected in a central data acquisition system, via at least one of a data carrier, communication, and a fault recorder collecting system.

10. A computer program for determining contact wear in an electrical switchgear of an electric switchgear assembly which can be loaded and executed on a data processing unit of a plant control system, wherein the computer program executes the steps of the method of claim 1 during implementation.

11. A device for implementing the method according to claim 1.

12. The device according to claim 11, wherein a) the electric switchgear is a circuit breaker and/or b) the current transformer is a conventional current transformer with a saturable core.

13. A high- or medium-voltage switchgear assembly with a device according to claim 11.

14. A high- or medium-voltage switchgear assembly with a device according to claim 12.

* * * * *